United States Patent [19]
Sterling

[11] Patent Number: 5,216,798
[45] Date of Patent: Jun. 8, 1993

[54] PROCESS FOR FORMING A BALANCED FLYWHEEL ASSEMBLY

[75] Inventor: Larry E. Sterling, Summerville, S.C.

[73] Assignee: Cummins Engine Company, Inc., Columbus, Ind.

[21] Appl. No.: 831,251

[22] Filed: Feb. 7, 1992

[51] Int. Cl.$^5$ .................... B23P 9/00; F16F 15/10
[52] U.S. Cl. .................... 29/445; 29/893.2; 74/572
[58] Field of Search .......... 29/445, 508, 515, 893, 29/893.2, 895.212; 74/572, 573 R, 574

[56] References Cited

U.S. PATENT DOCUMENTS

| | | |
|---|---|---|
| 2,647,847 | 4/1953 | Black et al. |
| 3,775,831 | 12/1973 | Cachat |
| 3,852,872 | 2/1974 | Afandor et al. |
| 4,860,611 | 8/1989 | Flanagan ............ 29/894 X |
| 4,870,736 | 10/1989 | Kacalieff ............ 29/447 X |
| 5,058,267 | 10/1991 | Andrä et al. ............ 29/447 X |
| 5,140,737 | 8/1992 | Noland ............ 29/402.13 |

OTHER PUBLICATIONS

Transfers of Flywheels Made by the Inventor.
"Calculations Improve Shrink Fits Large Gears and Wheels" appearing in the Jun. 19, 1947 issue of American Machinist.

Primary Examiner—Timothy V. Eley
Attorney, Agent, or Firm—Sixbey, Friedman, Leedom & Ferguson

[57] ABSTRACT

A process for forming a balanced flywheel assembly from a cast metal hub having at least one cast-in pick up and a ring gear having an inside shrink-fit surface with a predetermined diameter at ambient temperature by heating a ring gear sufficiently to cause the diameter of the inside shrink-fit surface to become larger than the diameter of a ring gear mounting surface of the cast metal hub, mounting the ring gear on the ring gear mounting surface, cooling the ring gear to shrink fit the ring gear onto the ring gear mounting surface, and balancing the cast metal hub and the ring gear assembly; various surfaces being formed on the cast metal hub by turning.

8 Claims, 20 Drawing Sheets

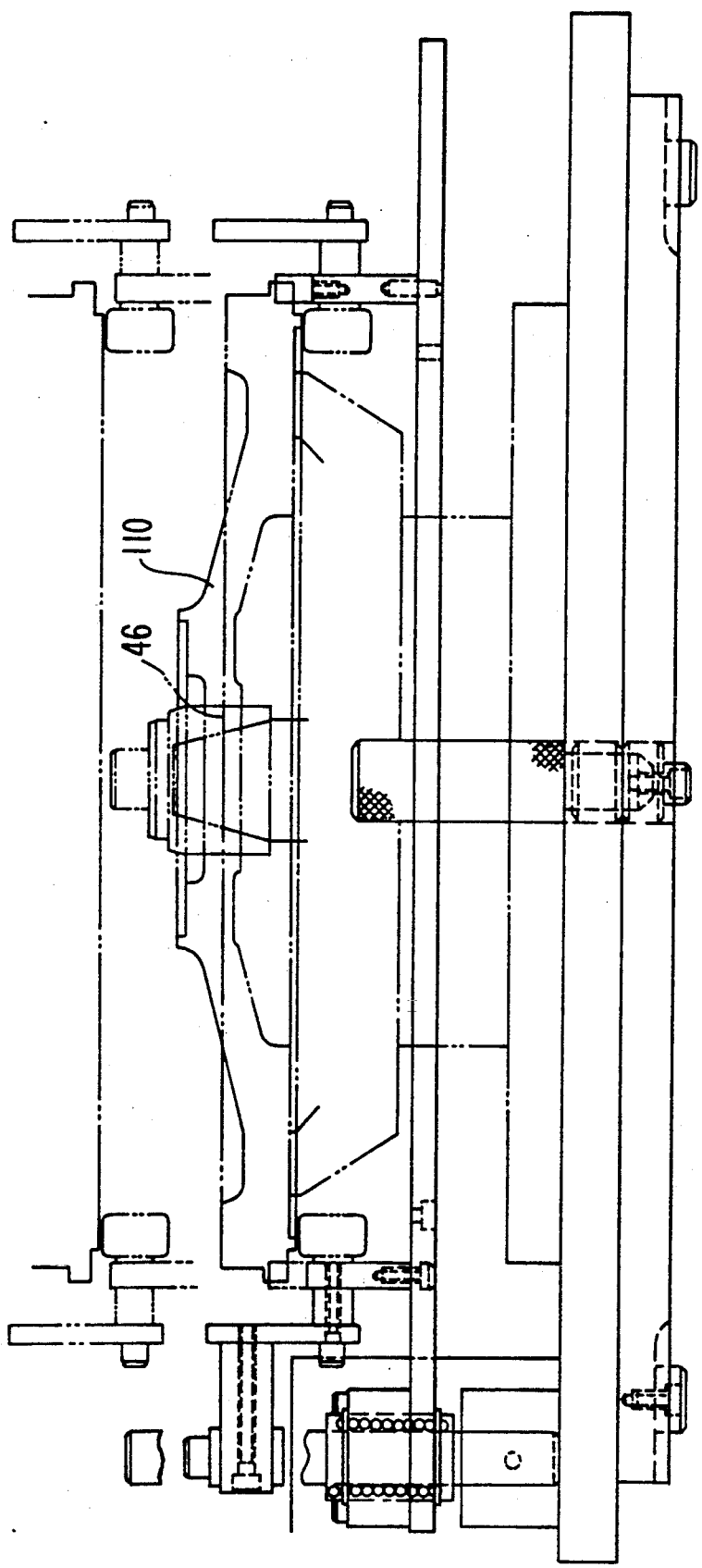

5,216,798

PROCESS FOR FORMING A BALANCED FLYWHEEL ASSEMBLY

FIELD OF THE INVENTION

This invention relates to the field of apparatus and processes for manufacturing flywheel assemblies for use, for example, on internal combustion engines.

BACKGROUND OF THE INVENTION

The manufacture of components for internal combustion engines is an extremely mature technology which has developed steadily for a period approaching an entire century. The science and technology of manufacturing engine components to meet the ever increasing demands for quality and reduced costs have driven manufacturers toward ever higher levels of automation and mechanization. The enormous costs associated with such high tech equipment, however, demands that production engineers employ standard equipment components whenever possible, thereby necessitating innovation of only the minimum amount of specialized tooling to cause such standard components to operate efficiently.

One area where the demand for minimizing costs while achieving the very highest possible quality is in the manufacture of flywheel assemblies for internal combustion engines. Such assemblies are essential to the proper functioning of an internal combustion engine in order to assure the smoothing out of torque impulses caused by the separate combustion strokes of each piston of the engine. Thus, designers are required to carefully consider the necessary weight and shape of the flywheel in association with the requirements of the engine in order to assure that the primary function of the flywheel is properly performed. Furthermore, the flywheel is often required to perform auxiliary functions such as, for example, providing a hub for mounting a ring gear adapted to engage the drive gear of a starter motor. The flywheel is also often used to provide the mounting of a clutch element to thereby provide a path for engine torque to be passed to the input of a vehicle transmission upon engagement of the corresponding clutch. Achievement of all of these functions requires that the flywheel be very carefully manufactured to close tolerances and to be assembled thereafter with a ring gear and clutch element.

To provide the necessary primary function of smoothing the torque impulses of the individual engine pistons, the flywheel for many engines must be quite large and heavy, (i.e., up to 20 inches or more in diameter and 300 lbs. or more in weight) making difficult the process of casting, handling and machining to achieve the desired final product. Because of the large rotational momentum desired from a flywheel assembly, and due to the rather large diameter and weight necessitated thereby, it is vitally important that the flywheel assembly be balanced very carefully prior to installation on a internal combustion engine. In one known process for achieving an acceptable flywheel assembly, it has been known to cast the flywheel hub and to move the hub through a series of work stations arranged to allow for careful machining by numerically controlled machine tools of the various critical surfaces of the flywheel, including the machining of a ring gear mounting surface. The flywheel hub is then balanced at a work station designed for this purpose and the ring gear is heat shrunk onto the ring gear mounting surface.

While the prior art approach is satisfactory in many ways, it failed to achieve all of the objectives associated with a relatively flawless, properly balanced flywheel assembly at a speed of production and at a cost adequate to meet modern competitive demands.

Prior art techniques for heat shrinking ring gears onto a flywheel hub are known as illustrated in U.S. Pat. No. 3,775,831. However, the precise machining steps involved in the procedure for forming the flywheel hub is not shown. Moreover, the conveying and handling mechanism illustrated in this patent fails to solve the numerous problems associated with achieving a high quality, low cost and properly balanced flywheel assembly.

Still other techniques for heat shrinking gears onto a hub support are known such as disclosed in an article in *American Machinists*. Jun. 19, 1948, entitled: "Calculations Improve Shrink Fits Large Gears and Wheels", pages 142-145. Again, however, techniques necessary for achieving a high production flywheel assembly are not disclosed in this article.

Outside of the flywheel manufacturing art, it is known in assembly processes generally to shrink fit a component followed by additional machining steps to assure that any misalignment, within limits, may be compensated for in the subsequent machining as taught by U.S. Pat. No. 3,852,872 to Afanador et al.

Yet another prior art technique is disclosed in U.S. Pat. No. 2,647,847 to Black et al for interfitting machine parts wherein one component is heat shrunk onto another followed by subsequent machining operations to insure uniform bore. Still the prior art has failed to solve the problems associated with achieving the maximum degree of quality in forming a flywheel assembly while also assuring high production rates utilizing the minimum degree of investment in the tooling necessary for carrying out the desired end results.

SUMMARY OF THE INVENTION

It is an object of this invention to overcome the deficiencies of the prior art by providing apparatus for making, assembling and balancing a flywheel assembly by employing a series of work stations arranged and designed to implement a unique series of steps in order to provide an improved, low cost flywheel assembly.

A more specific object of the subject invention is to provide a flywheel assembly manufacturing apparatus and facility for performing a series of steps in a unique sequence in order to assure a flywheel assembly which is reliably and consistently balanced within the specifications demanded by modern internal combustion engine manufacturers.

A still more specific object of this invention is to provide a process and apparatus for forming a balanced flywheel assembly from a cast metal hub having at least one cast-in pick-up and a ring gear having an inside shrink-fit surface with a predetermined diameter including the steps of performing successive clamping and turning or machining operations interrupted by the shrink-fit mounting of a ring gear followed by balancing of the cast metal hub and ring gear assembly.

A still more specific object of the subject invention is to provide a process for forming a balanced flywheel assembly from a cast metal hub including the provision of a first work station at which the cast metal hub may be clamped in a metal turning machine tool to define a central axis about which the cast metal hub may be rotated to allow formation of a first surface which is concentric about a central axis and to provide a second work station to which the cast metal hub may be moved from the first work station so that the hub may be clamped with its opposite side facing outwardly for turning about the same central axis to allow formation of a ring gear mounting surface concentric about the central axis of the hub. Following formation of the ring gear mounting surface, the rotation of the cast metal hub is halted in order to allow a heated ring gear to be mounted on the cast metal hub after which the hub and gear assembly are subjected to additional machining operations and then moved to a work station at which the assembly is balanced.

A still more specific object of this invention is to provide a process for forming a balanced flywheel assembly from a cast metal hub having at least one cast-in pick-up and a ring gear having an inside shrink-fit surface with a predetermined diameter at ambient temperature including the steps of clamping the cast metal hub in a metal turning machine tool using the cast-in pick-up to locate the hub in a position to define a central axis about which the cast metal hub may be rotated for metal turning followed by the step of forming by turning a first surface which is concentric about the central axis as the casting is rotated. The process then provides for unclamping the cast metal hub and reclamping the cast metal hub on the turned first surface so that a ring gear mounting surface concentric about the central axis may be formed. This process then provides for heating a ring gear sufficiently to cause the diameter of the inside shrink-fit surface of the ring gear to become larger than the diameter of the ring gear mounting surface so that the ring gear may be mounted on the hub and cooled into a shrink-fit engagement. The process provides for additional machining steps to the flywheel assembly after which the assembly is balanced to form the finished flywheel assembly.

The disclosed process includes the steps of unclamping and reclamping the cast metal hub subsequent to the step of heating and mounting the ring gear to relieve stress in the cast metal hub and ring gear assembly.

Yet another object of the subject invention is to provide a flywheel assembly conveying apparatus for allowing flywheel assemblies to be loaded at one end for movement into a numerically controlled boring machine tool wherein the conveyor is adjustable to accommodate flywheel assemblies of differing shapes and sizes. The conveying apparatus receives the flywheel assemblies in a loading position, allows the flywheel assemblies to be moved through multiple work stations and released to an unloading position. The disclosed conveying apparatus further provides for loading and unloading of the flywheel assemblies while the conveyor is in a vertically elevated position following which the flywheel assemblies may be lowered onto specially designed fixtures which are arranged to properly position and index the flywheel assemblies about predetermined vertical axes to thereby permit the numerically controlled boring machine tool to form a desired pattern of holes in the cast metal flywheel hub.

A still more specific object of the subject invention is to provide a unique conveying mechanism including a pair of spaced apart rails mounted for being adjustably positioned to accommodate flywheel assemblies of differing sizes and diameter wherein the rails are further mounted for elevational movement relative to a plurality of tooling fixtures so that in the elevated position the flywheel assemblies may be moved from a loading station through successive work stations to an unloading station and into a lowered position for depositing flywheels on tooling fixtures adapted to position properly and to index successively the flywheel assemblies for operation by the boring machine tool.

A still more specific object is to provide a conveyor including a pair of spaced apart rails upon which are mounted a series of rollers designed to engage the periphery of a cast metal flywheel hub as the hubs move to successive work stations. Each rail is mounted on a pair of movable supports designed for movement in unison along a pair of axes arranged perpendicularly to the longitudinal axes of the rails. Means may be provided for allowing the respective rails to be simultaneously moved toward or away from each other relative to a fixed central axis located parallel to the rails and midway therebetween.

Still other and more specific objects of the subject invention may be understood by considering the following Brief Summary of the Drawings and Description of the Preferred Embodiments.

BRIEF SUMMARY OF THE DRAWINGS

FIG. 21 is a end elevational view of the conveyor mechanism illustrated in FIGS. 19 and 20 used to convey a cast metal flywheel hub having shape differing from the flywheel hub illustrated in FIGS. 7-15.

DETAILED DESCRIPTION OF THE PREFERRED EMBODIMENTS

Figure 1:
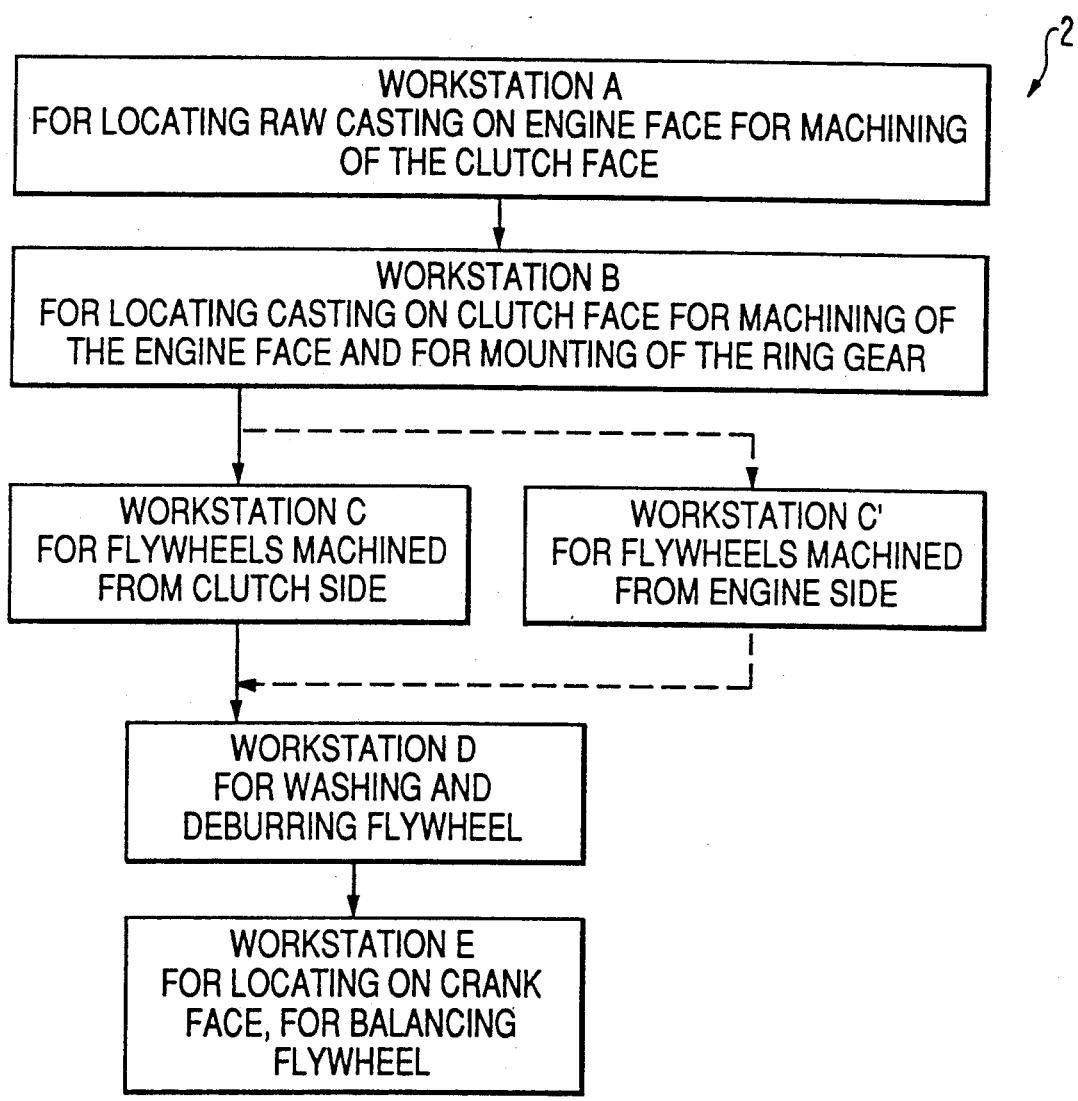
FIG. 1 is a highly schematic drawing of a production facility designed for implementing the subject invention.

For a more particular understanding of the subject invention, reference is now made to FIG. 1 which describes in a highly schematic form the organization of a production facility designed to implement the subject invention and to perform the process required to form in an economical fashion high quality precisely balanced flywheel assemblies. More particularly, the manufacturing facility 2 which forms this invention includes a first work station A at which a raw cast metal flywheel hub is chucked from the engine face side of the hub to allow for machining of the clutch face. From this work station, the hub would be moved to the second work station B at which the hub would be clamped in a chuck on the clutch face side for machining of the engine face followed by heat shrink mounting of a ring gear.

Depending on the type of flywheel hub design to which the subject invention is applied, the hub would move either to work station C or to work station C'. Work station C would receive flywheels to be machined from the clutch side while work station C' would receive flywheels designed to be machined from the engine side. Once the operations at either work station C or C' are completed, the hub would then move to a washing and deburring work station D.

After washing and deburring the hub would move to a work station F, at which the hub and ring gear assembly would be balanced as the final step in the manufacturing operation, thereby assuring that the most accurate possible balance of the flywheel assembly is achieved.

Figure 2:
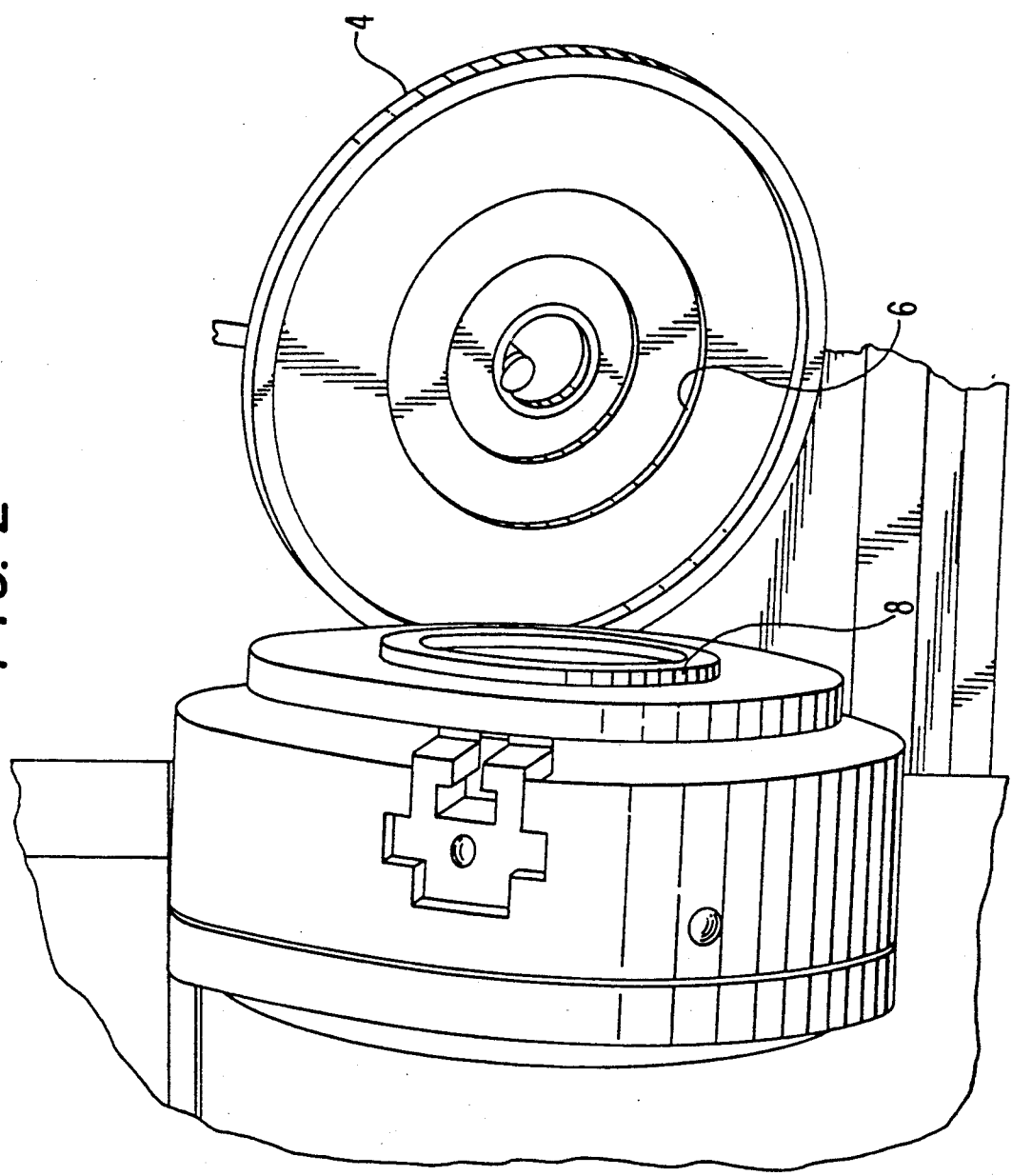
FIG. 2 is a perspective view of a partially machined cast metal flywheel hub being mounted on a specially designed clamping fixture designed in accordance with the subject invention, FIG. 3 discloses a perspective view of the cast metal flywheel hub of FIG. 2 fully mounted on the fixture following machining of a plurality of different critical surfaces including a ring gear mounting surface.

FIG. 2 is an illustration of the process of mounting a cast metal flywheel hub 4 at work station B. In particular, the casting is being mounted on a special fixture designed to engage on the finished slinger inside bore diameter 6 by means of a specially designed chuck 8.

Figure 3:
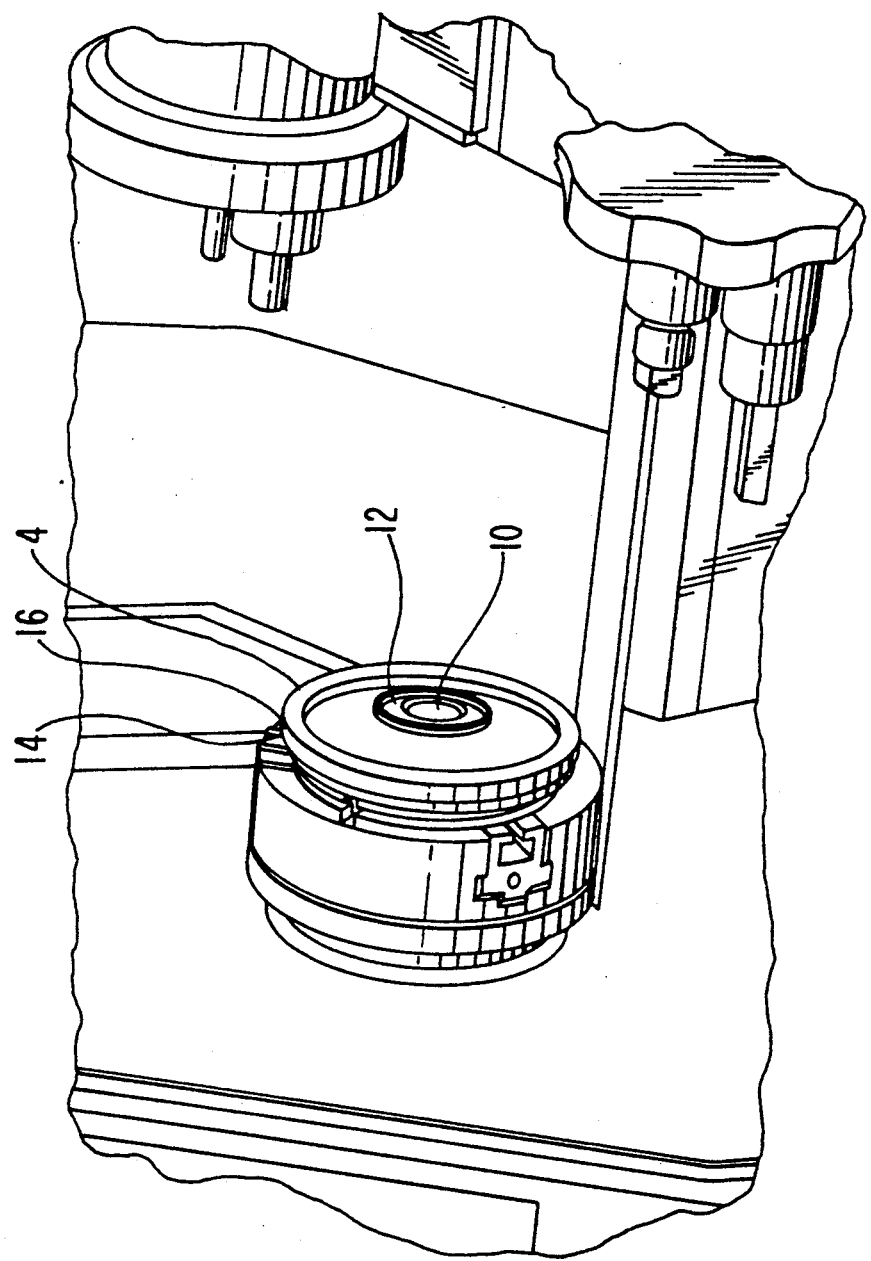

FIG. 3 is a perspective view of the cast metal flywheel hub 4 illustrated in FIG. 2 following rough machining from the engine face of the crank bore 10, crank mounting face 12 as well as both a rough and finish machining of the outside diameter of the casting 14 and a rough and finish machining of the ring gear mounting surface 16.

Figure 4:
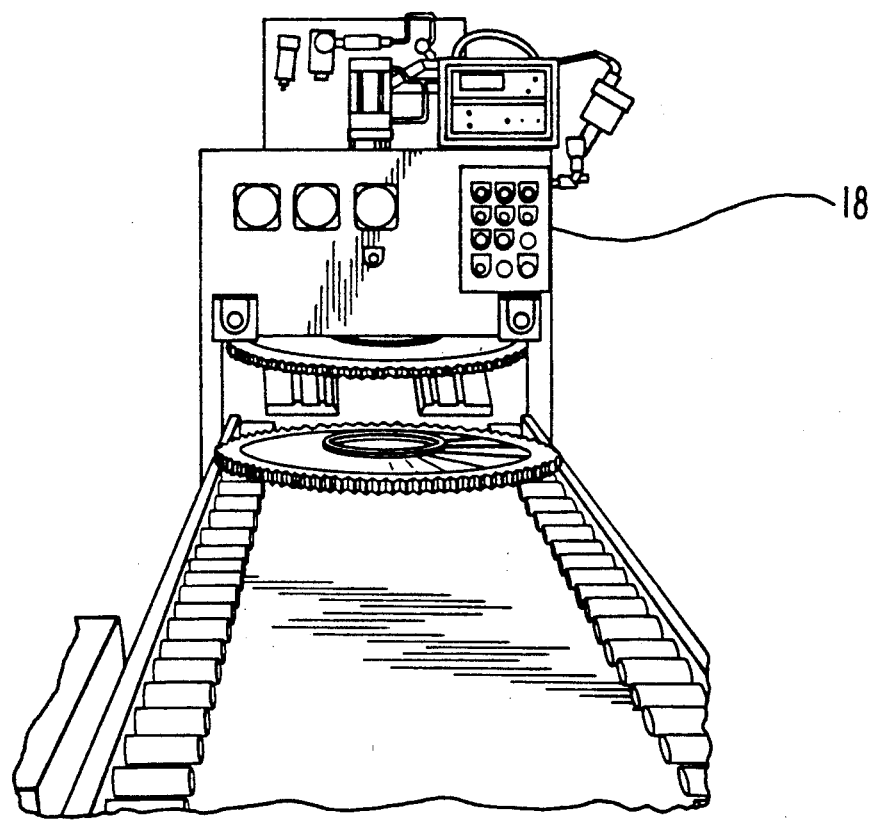
FIG. 4 is a perspective view of a ring gear heater used in the subject invention.

FIG. 4 illustrates a special ring gear heater 18 to which the ring gear is moved in generally horizontal configuration.

Figure 5:
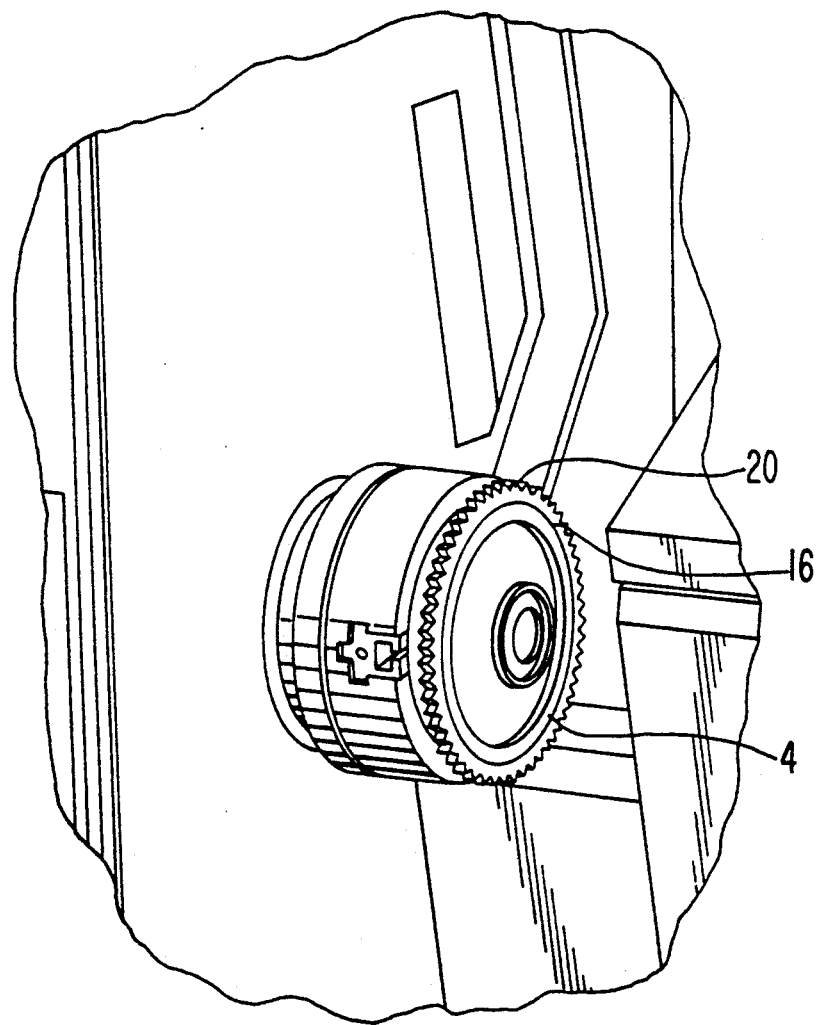
FIG. 5 is a perspective view of a heated ring gear being mounted on the ring gear mounting surface illustrated in FIG. 3.

FIG. 5 is a perspective illustration of the mounting of a heated ring gear 20 onto the ring gear mounting surface 16 of the flywheel hub 4 illustrated in FIG. 3.

Figure 6:
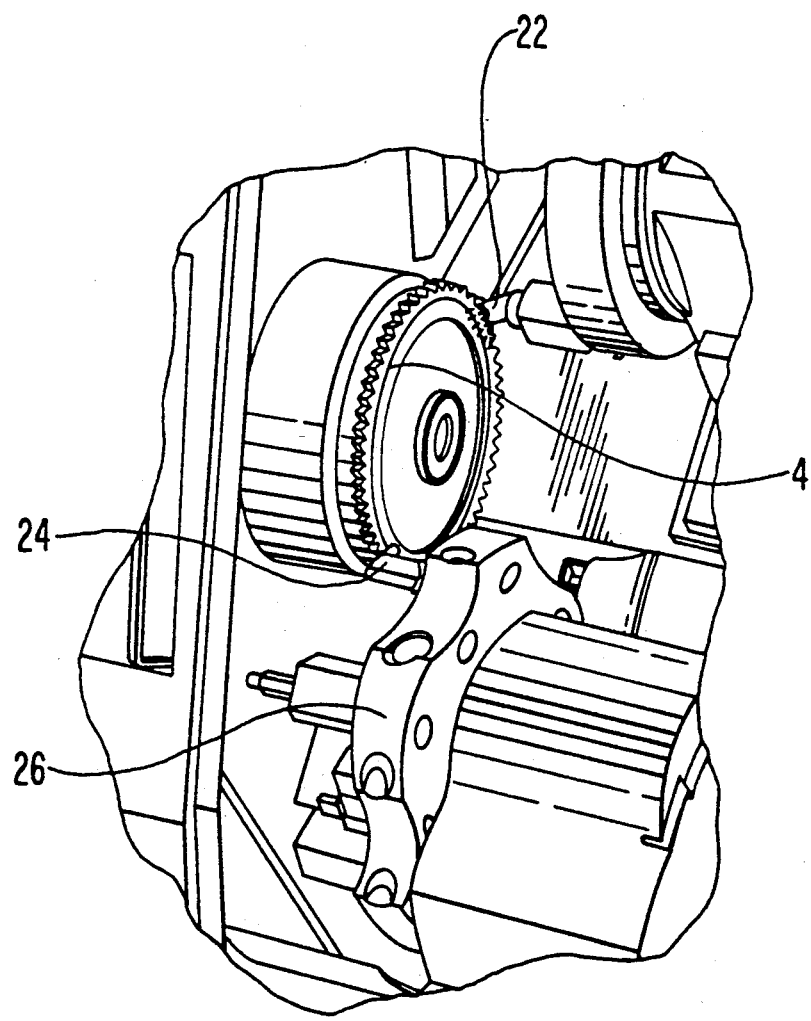
FIG. 6 is a perspective view of a ring gear being cooled by a spray of coolant and being positioned by means of a special roller mounted in the machine tool turret to insure that the ring gear is properly positioned on the cast metal flywheel hub.

Referring now to FIG. 6, a perspective illustration is shown of the operations performed at work station B following mounting of the heated ring gear as illustrated in FIG. 5. In particular, FIG. 6 shows the application of coolant to the heated ring gear while it is rotating in order to cause the ring gear to shrink into very tight frictional engagement with the ring gear mounting surface of the hub 4. This coolant is applied by the coolant spray head 22. The ring gear is assured of proper positioning by means of an engaging roller 24 mounted in the machine tool turret 26. Operation of the various clutch fixtures and machine tools illustrated in FIGS. 2-6 will be described in greater detail hereinbelow.

Figure 7:
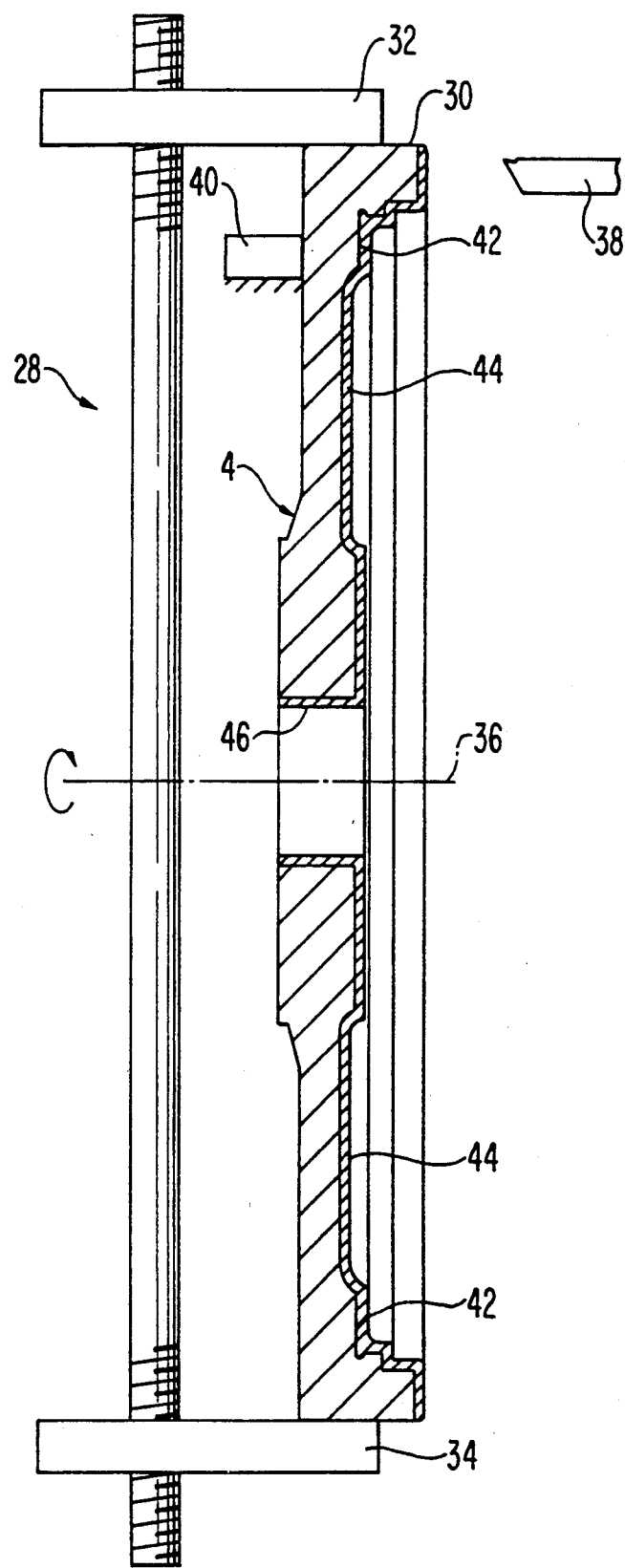
FIG. 7 illustrates a rotating chuck for clamping the outer periphery of a cast metal flywheel hub to allow machining of the clutch face side of the hub.

Reference is now made to FIG. 7 which illustrates in highly schematic form the chuck fixture employed at work station A whereby a cast metal flywheel hub 4 in its state as a raw casting is clamped on its rough outer perimeter surface 30 by means of chuck jaws 32-34. Obviously, a plurality of such jaws are provided about the perimeter of the chuck in order to hold the casting in a fixed position and to define a rotational axis 36 for casting 4. Axis 36 is the rotational axis about which chuck fixture 28 is adapted to be rotated during the machining operation. For illustration purposes only, a metal cutting tool 38 is shown in FIG. 7 which may be one of several cutting tools mounted in the turret of the machine tool located at work station A. Such cutting tools are formed to provide appropriate cutting means by which the various surfaces on the clutch side of hub 4 may be appropriately machined.

In addition to being positioned on the peripheral outer surface 30, raw casting is positioned by means of three stops 40 (only one of which is illustrated in FIG. 7) arranged to engage three separate pick-up points formed on the engine face side of the hub 4 during the casting process. The areas shown generally in double cross-hatching in FIG. 7 may be machined when the hub is rotated about axis 36 at work station A. In particular, this area of the casting includes the rough and finish machining of clutch face 42 which is adapted to engage a clutch element which will be mounted in direct contact therewith. A slinger bore area 44 will also be rough and finish machined to define a pathway for lubrication oil to move in the area between the portion of hub 4 and the peripheral area which defines clutch face 42. The pilot bore 46 located in the center of the hub will be rough machined to leave approximately 0.025 inches of stock for a finish machining operation to be described hereinafter. Chamfer or machine radius may be provided on all edges of the clutch side. The flywheel hub is then removed and advanced to work station B.

Figure 8:
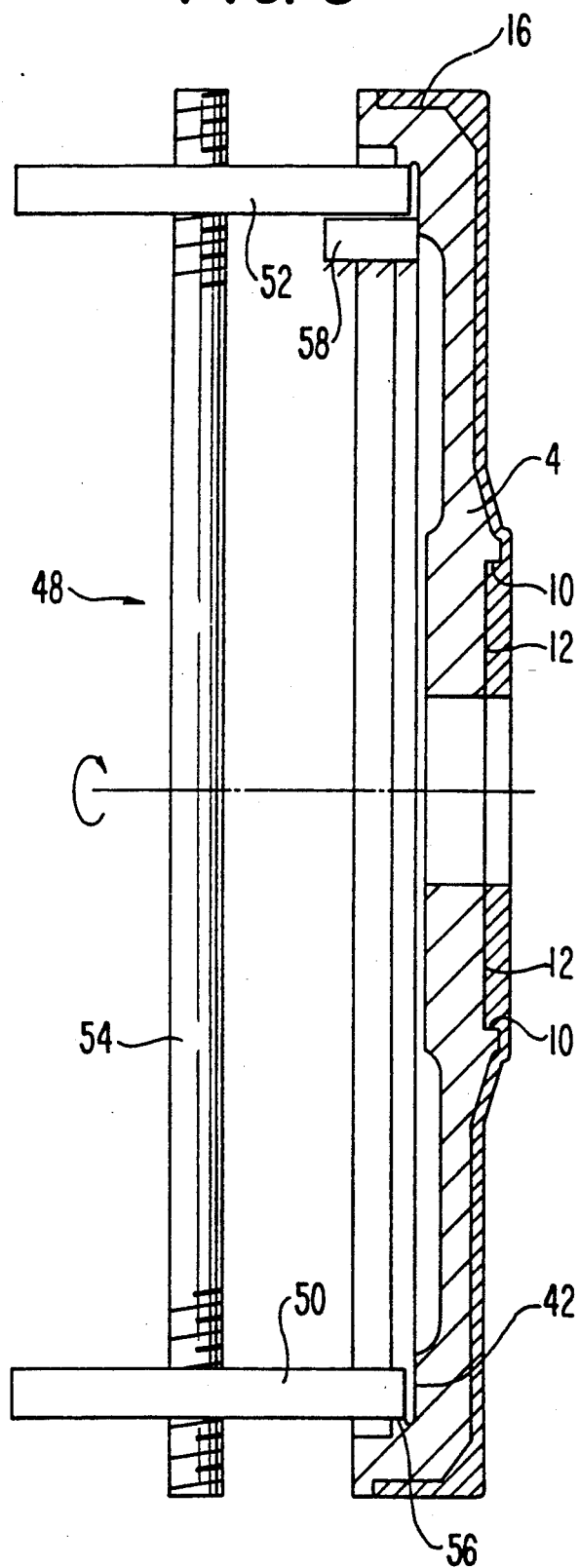
FIG. 8 illustrates a rotatable chuck for clamping the inside of the cast metal flywheel hub following the machining illustrated in FIG. 7.

FIG. 8 is a schematic illustration of the clutch fixture 48 used at work station B. This fixture includes a plurality of chuck elements 50–52 (only two of which are illustrated in FIG. 8) which are arranged to be spread apart by any type of operating mechanism schematically illustrated as threaded member 54 to cause the chuck elements 50–52 to engage on the inside diameter of the slinger bore 56 adjacent clutch face 42. Hub 4 is located by a plurality of stop elements 58 (only one of which is illustrated in FIG. 8) to properly position the hub 4 in chuck fixture 48.

At work station B, the ring gear support surface 16 is subjected to additional machining operations and then moved to a work station at which the assembly is balanced. Surface 16 is rough and finish machined by means of an appropriate cutting tool (not illustrated). In addition, the crank face 12 is rough machined along with the crank bore 10. At this point, the rotational movement of chuck fixture 48 is stopped and ring gear adapted to be mounted on hub 4 is heated in a induction heater (see FIG. 4). This heater is designed to raise the temperature of the ring gear to 350° to 400° F. When the gear has reached this temperature it is removed and installed on the ring gear support surface 16.

Figure 9:
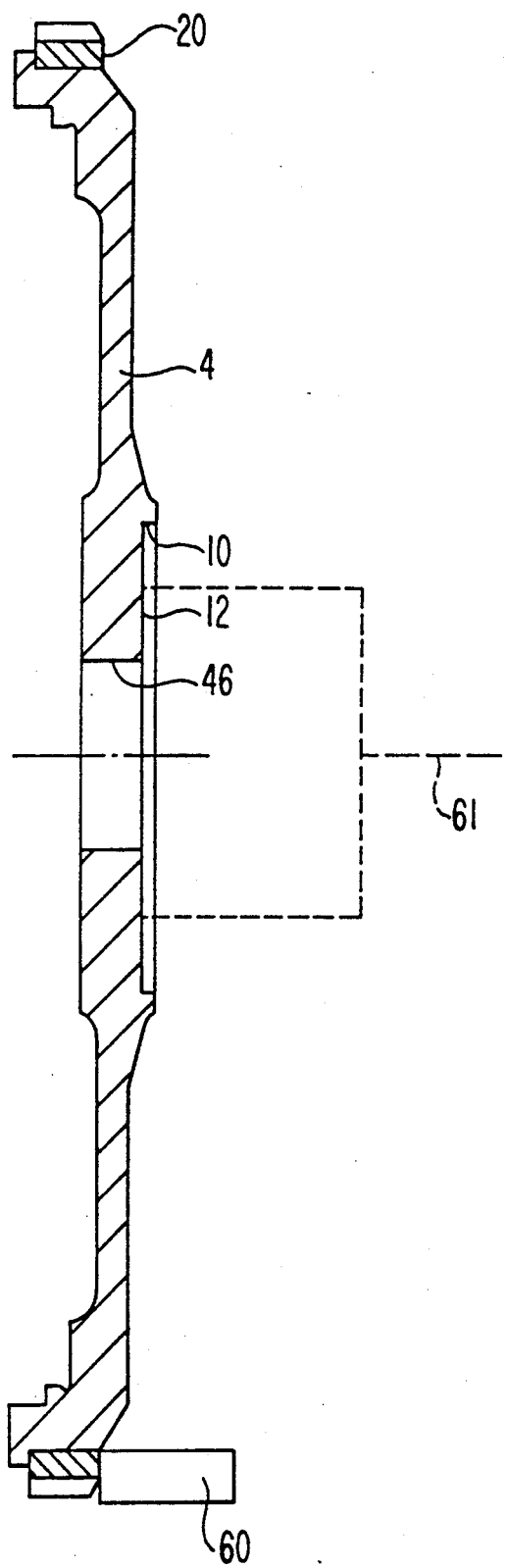
FIG. 9 illustrates the machine tool fixtures shown in FIG. 6 following installation of a heated ring gear and the subsequent coolant spraying and roller positioning applied to the ring gear.

Reference is now made to FIG. 9 which shows casting 4 while still mounted in chuck fixture 48 (not illustrated). After the initial machining operations, which take place at work station B, mounting of the heater ring gear 20 takes place. At this point, a special roller positioned in the turret 26 (FIG. 6) is moved into position to bias ring gear 20 into its proper position as hub 4 is rotated and coolant is sprayed onto ring gear 20. While still mounted in chuck fixture 48, a special pusher element 61 (illustrated in dashed lines) mounted in turret 26 will be moved into biasing engagement with hub 4 to push hub 4 against the rotating chuck fixture 48 to allow the chuck elements 50–52 to be moved radially inwardly to relieve stress on the flywheel assembly.

Figure 10:
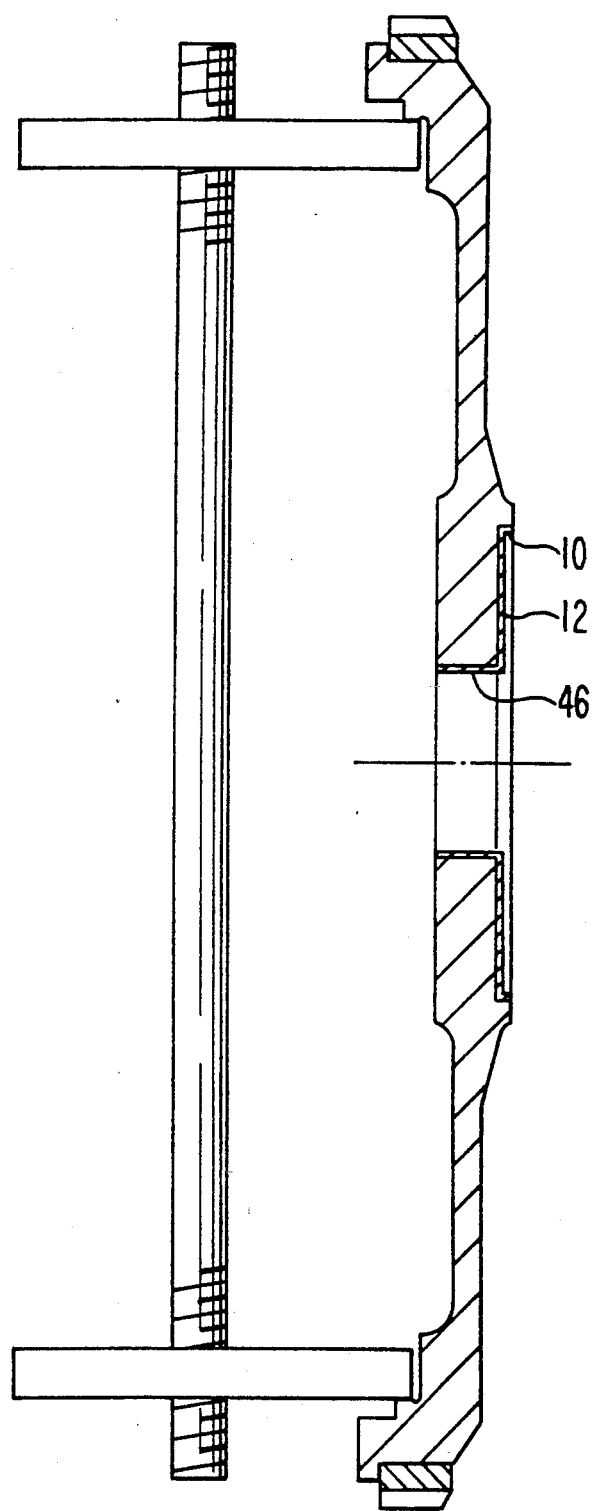
FIG. 10 illustrates the apparatus required for a finish machining of the crank bore, crank face and pilot bore of the cast metal hub following the operations illustrated in FIG. 9.
Figure 11:
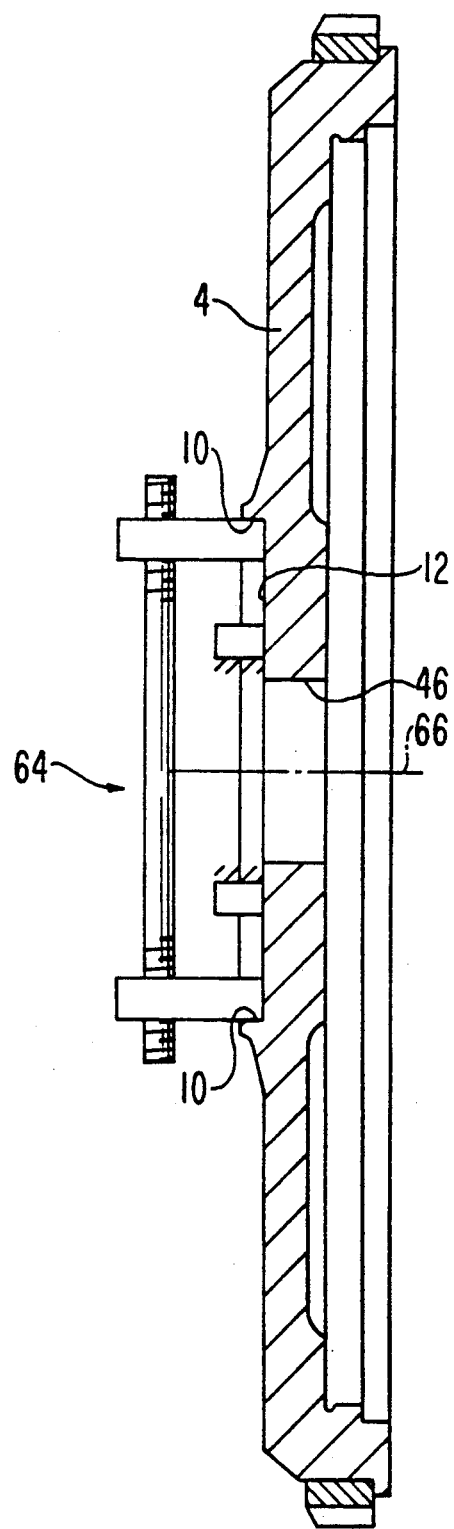
FIG. 11 illustrates the chuck mechanism for flywheels which must be machined from the clutch side following the operation illustrated in FIG. 10.

The chuck elements are then reengaged with hub 4 and the pusher element (not illustrated) is removed to allow finish machining of crank bore 10, crank face 12 and pilot bore 46. This operation is illustrated in FIG. 10. At this point, hub 4 is removed from work station B and transported to either work station C or work station C'. If the hub is of the type requiring machining from the clutch side, it will be forwarded to work station C illustrated in FIG. 11. Chuck fixture 62 is provided for chucking or clamping. FIG. 11 provides for locating hub 4 on the finished crank face by means of position or stop elements 62 and clamps the hub 4 on the engine side on the finish crank bore 10 by means of a chuck fixture 64 adapted to rotate about axis 66. As will be described more fully hereinafter, a special fixture may be used for implementing the function illustrated in FIG. 11. In this position, the mounting holes for the crank and clutch element may be formed in hub 4 by a numerically controlled boring machine commercially available design. A master dowel hole may also be formed in the hub 4. It is crucial at this juncture that the true position of the flywheel assembly be held to within 0.004 inch.

Figure 12:
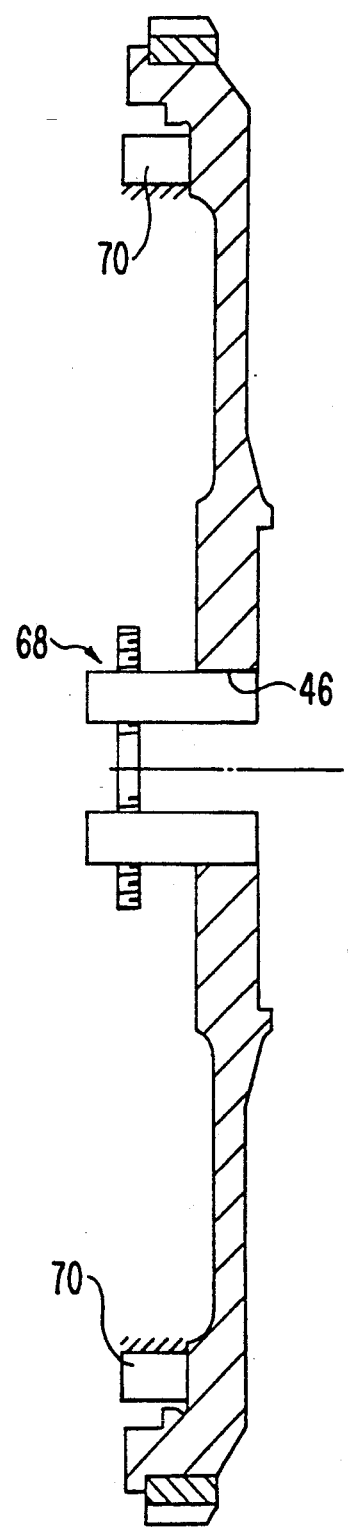
FIG. 12 illustrates apparatus for positioning and machining a cast metal hub and ring gear assembly following the operation of FIG. 10 when the flywheel assembly requires machining from the engine side.

Alternatively, hub 4 may be moved to work station C' if the flywheel hub is of the type requiring machining from the engine side. FIG. 12 illustrates such an arrangement wherein a special chuck fixture 68 is adapted to expand into engagement with pilot bore 46 and hub 4 is located by positioning stops 70. As with work station C, when mounted in the fixture illustrated in FIG. 12, the crank mounting holes, clutch mounting holes and master dowel and timing slots may be formed in hub 4 by means of a numerically controlled boring machine tool. When held in the chuck fixture illustrated in FIG. 12, the true position must be within 0.005 inches. As the successive holes are formed by the numerically controlled boring machine tool, hubs 4 are indexed by the chuck fixture 64 or 68 as will be described more fully hereinbelow.

Figure 14:
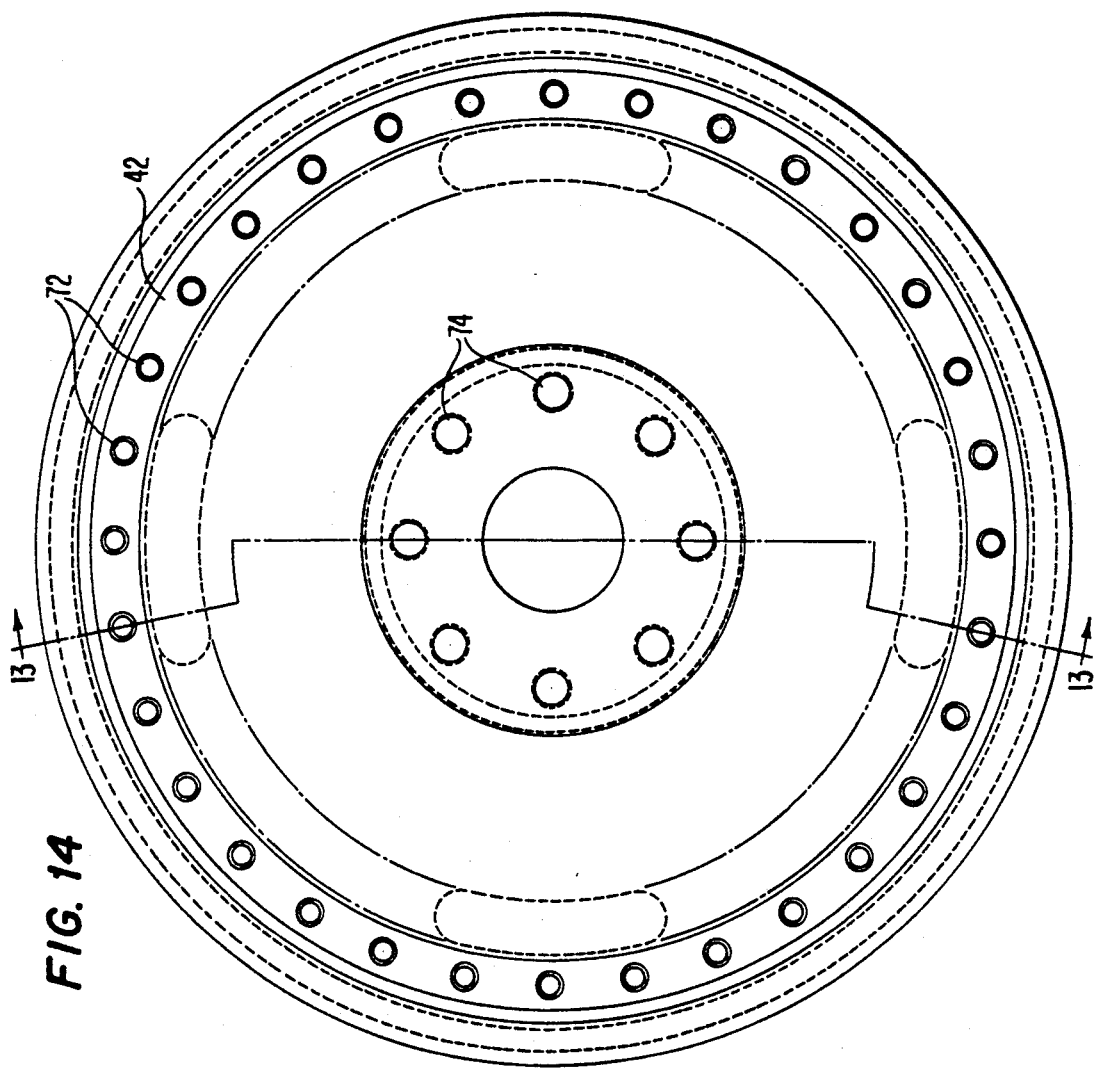
FIG. 14 is a side elevational view of the flywheel assembly of FIG. 13 without the ring gear shown thereon.
Figure 13:
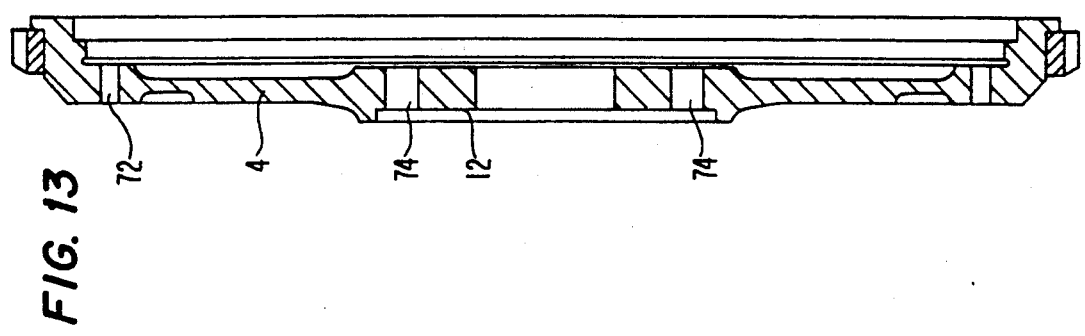
FIG. 13 is a cross-sectional view of a flywheel assembly following the machining steps performed by the apparatus in FIG. 11 or FIG. 12.

Reference is now made to FIGS. 13 and 14 which disclose a flywheel assembly in which the clutch mounting holes 72 are illustrated as being equal angularly positioned near the periphery of the hub 4 passing through clutch face 42. Similarly, the crank mounting holes 74 are formed in an equal angular pattern around the central axis of the hub and extending axially from the clutch side to the engine side of the hub. Hole 74 opens into the crank face 12 of hub 4. Finally, after the holes are machined in work station C or work station C', the hub assembly is moved through a washing and deburring work station D.

Figure 15:
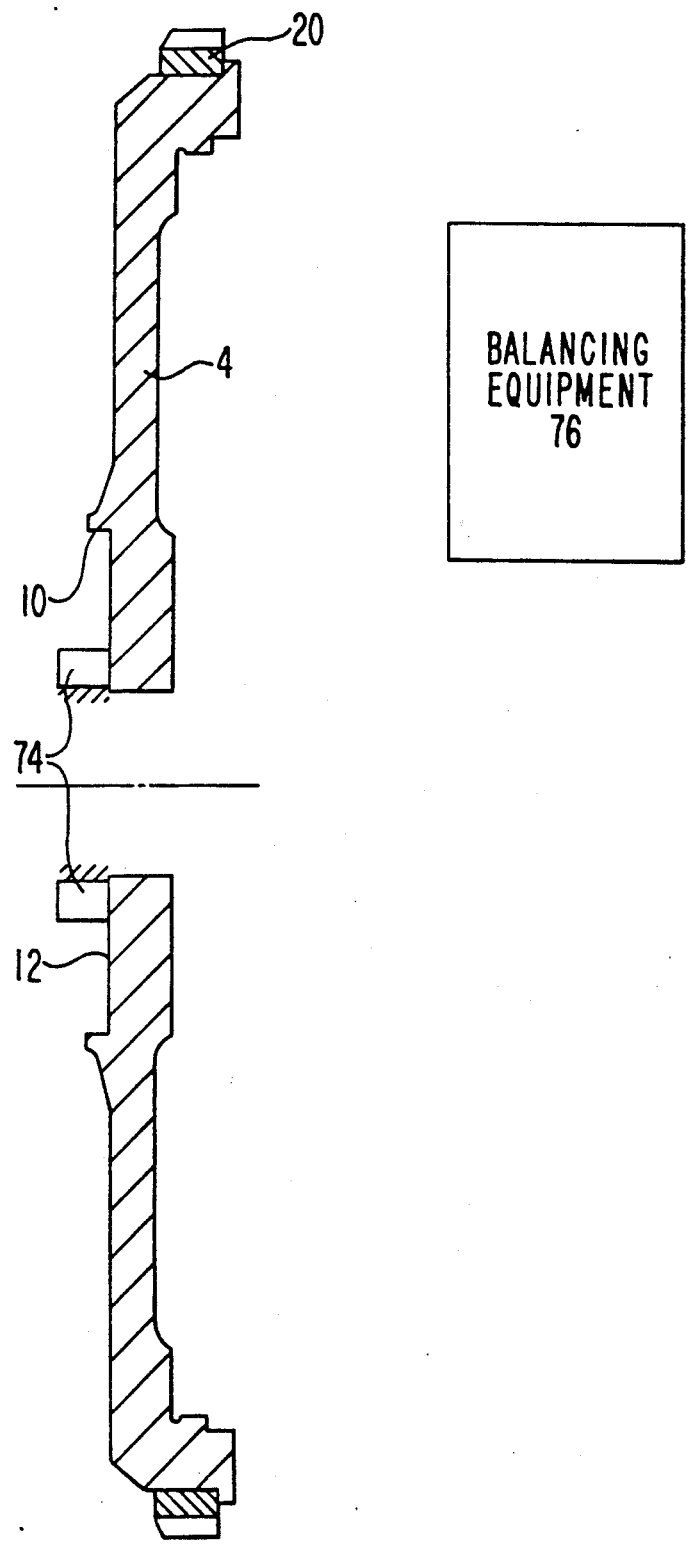
FIG. 15 illustrates the apparatus required for balancing the flywheel assembly at the final step in the manufacturer of a flywheel assembly in the subject invention.
Figure 16:
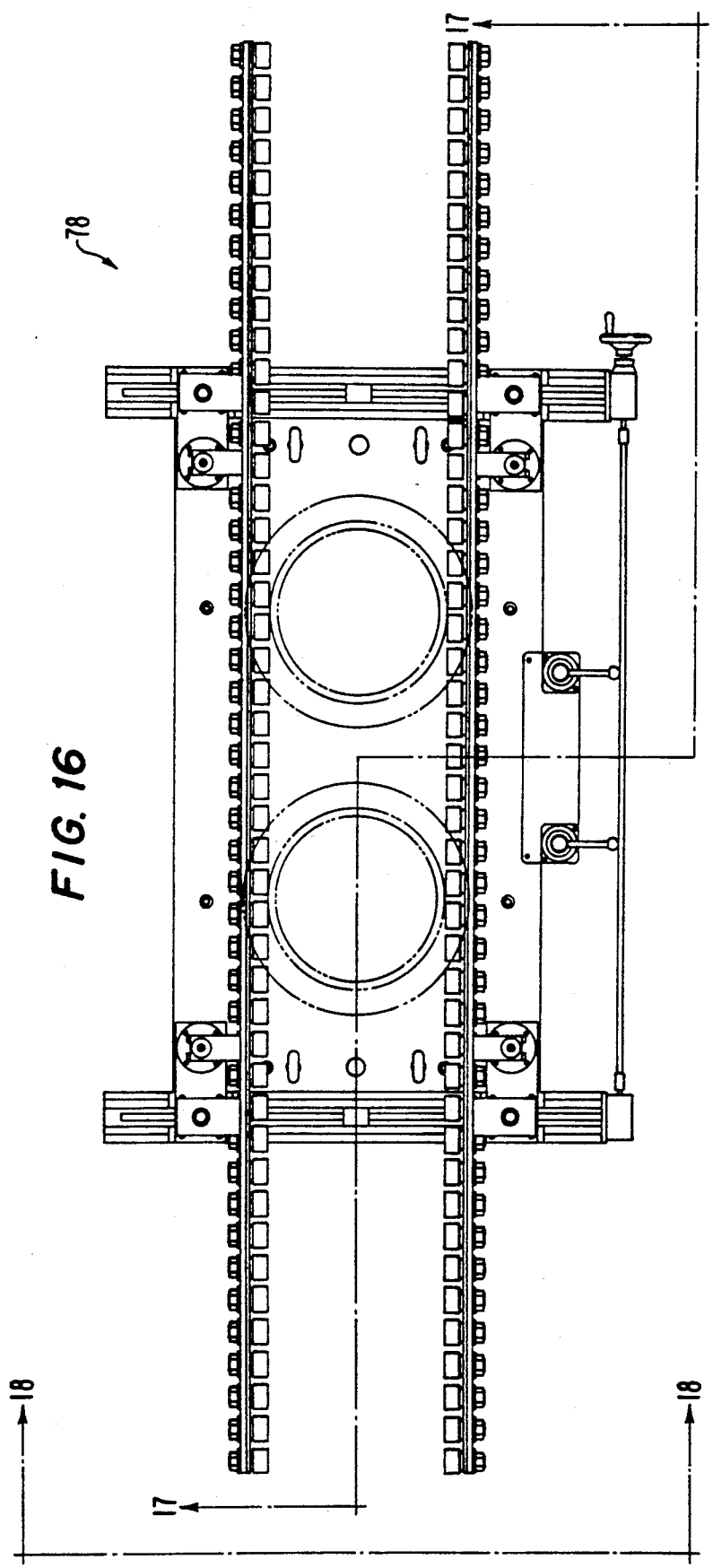
FIG. 16 is a top elevational view of a conveyor mechanism adapted for use in performing the machining steps illustrated in FIGS. 11 and 12.
Figure 17:
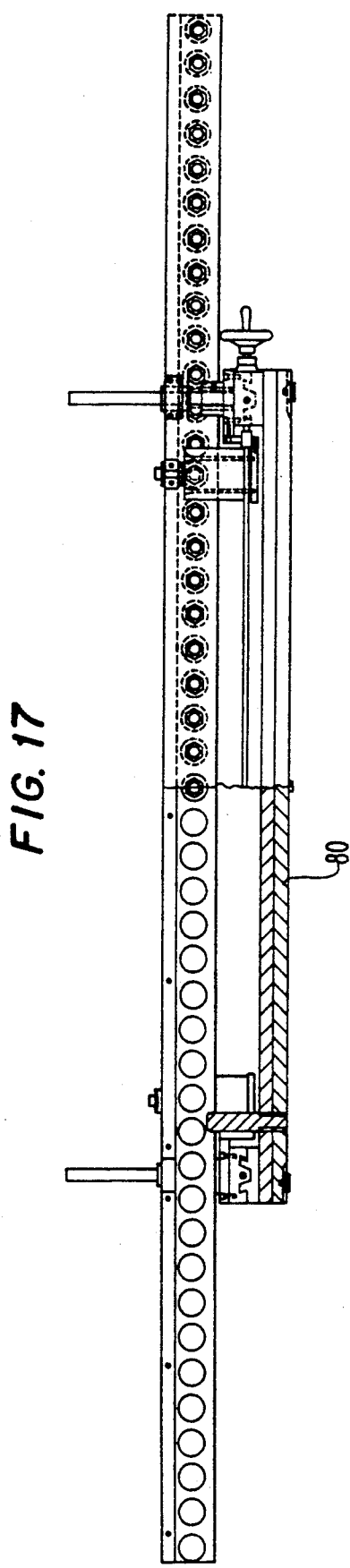
FIG. 17 is a partial cross-sectional view of the conveyor mechanism illustrated in FIG. 16 taken along the lines of 17—17.

Finally, the flywheel assembly is moved to Work Station E illustrated in FIG. 15 wherein the assembly 4 and 20 are located on the crank face by positioning elements 74 and are clamped in finished crank bore 10 by fixture (not illustrated) to allow the flywheel to be very accurately balanced by balancing equipment 76.

Figure 18:
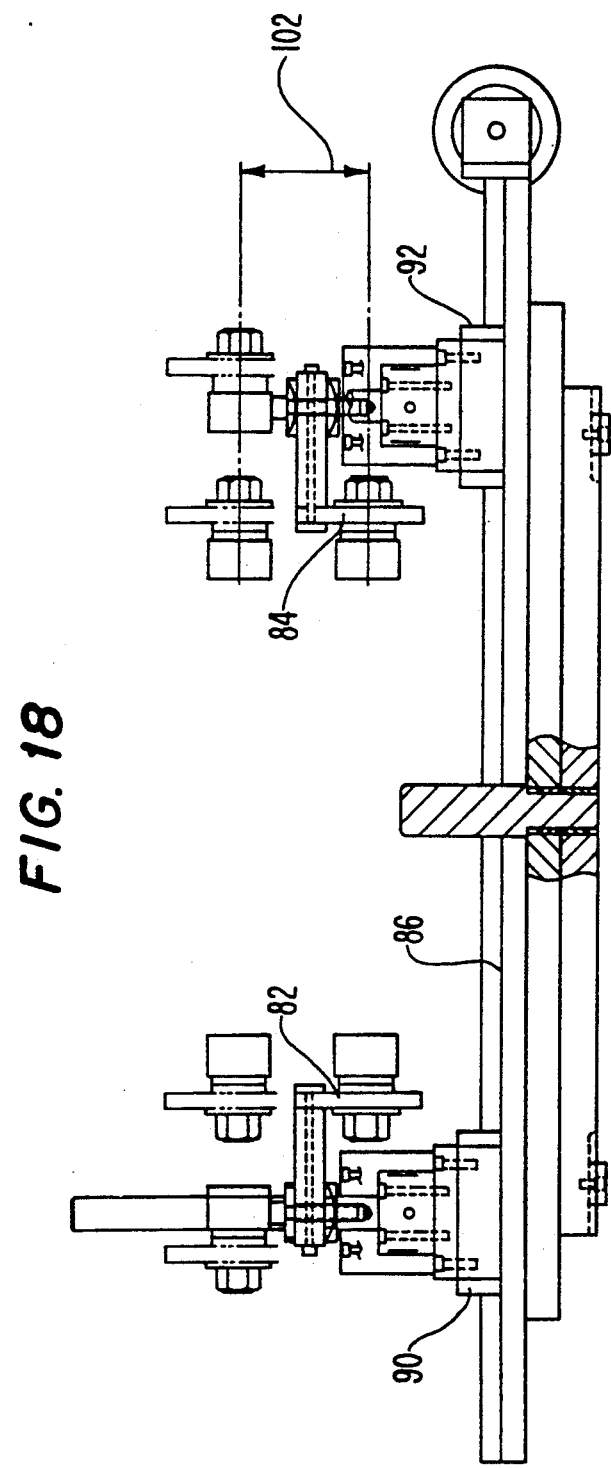
FIG. 18 is an end elevational view taken in the direction of arrows 18—18 in FIG. 16 showing the maximum side to side adjustment of spaced apart rails and the maximum vertical stroke of the conveyor mechanism which forms a portion of the subject invention.
Figure 19:
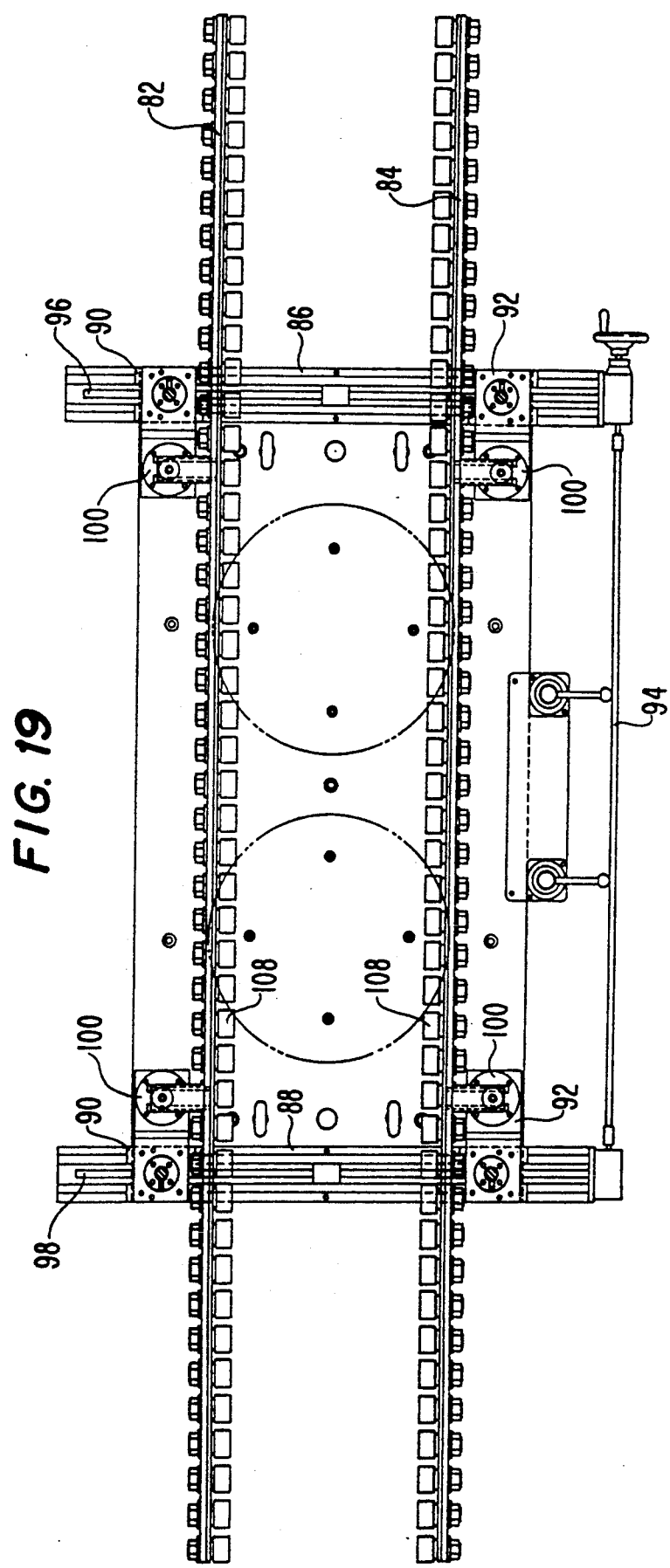
FIG. 19 is another top elevational view of the conveyor mechanism designed in accordance with the subject invention.
Figure 20:
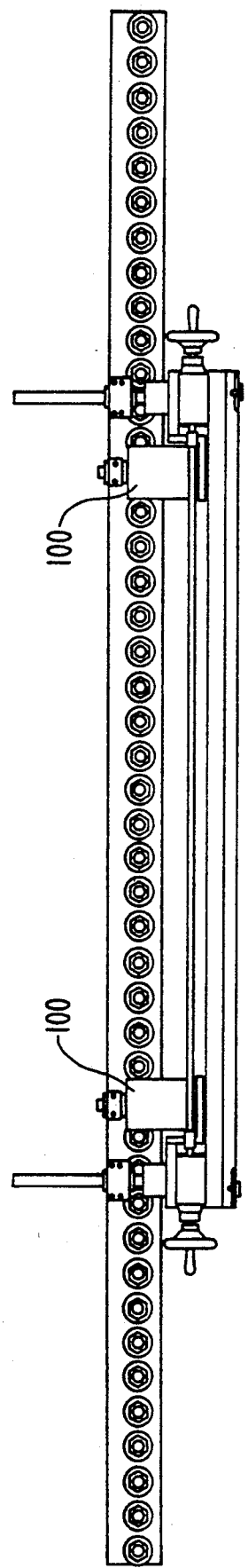
FIG. 20 is a side elevational view of the conveyor mechanism illustrated in FIG. 19.

To facilitate movement of the flywheel assemblies into and out of work stations C or C', a specially designed conveyor mechanism is provided as illustrated in FIGS. 16–21. This mechanism 78 includes a base 80 for supporting a pair of guide rails 82 and 84 secured to base 80 by means of a pair of cross guides 86 and 88. Each guide rail is supported on a pair of movable supports 90 for rail 82 and 92 for rail 84. Supports 90 and 92 may be moved toward or away from one another simultaneously by means of a drive mechanism consisting of a drive shaft 94 operating in tandem a pair of threaded lead screws 96 and 98 appropriately connected to one of each pair of supports 90 and 92, respectively, through threaded connections to cause rails 82 and 84 to move together when drive shaft 94 is rotated in one direction and apart when drive shaft 94 is rotated in the opposite direction. Each support is provided with a corresponding hydraulic operator 100 for causing the respective rails to be moved upwardly or downwardly through a stroke 102. The rails may be moved to a minimum position 104 all the way to a maximum position 106 as illustrated in FIG. 18.

Each rail 82 and 84 includes a series of closely spaced support rollers 108 arranged to supportingly engage the periphery of a flywheel as its moves in longitudinal direction between the spaced rails. The adjustability of rails 82 and 84 in the horizontal direction allows the rails to accommodate flywheel assemblies of a wide variety of configurations whereas the elevation and lower capability of hydraulic operator 100 allow the individual flywheel assemblies to be lowered onto the special fixtures illustrated in FIGS. 11 and 12 FIG. 21 illustrates an end elevational view of the conveyor mechanism in which a flywheel assembly having a shape different from that illustrated in FIGS. 8–15 has been mounted. In particular, this flywheel is of the type adapted to be machined from the engine side and is mounted by means of a speed grip mechanism adapted to expand radially into contact with the pilot bore 46 of the flywheel assembly 110.

In summary, a flywheel manufacturing apparatus and process has been disclosed which achieves all of the objectives of high manufacturing quality and low cost as described above.

I claim:

1. A process for forming a balanced flywheel assembly from a cast metal hub having at least one castin pick up and a ring gear having an inside shrink-fit surface with a predetermined diameter at ambient temperature, comprising the steps of
   a. clamping said cast metal hub in a metal turning machine tool using the said cast-in pick up to define a central axis about which said cast metal hub may be rotated for metal turning,
   b. forming by turning a first surface which is concentric about said central axis as said casting is rotated about said central axis,
   c. unclamping said cast metal hub and reclamping said cast metal hub on said first surface in a metal turning machine for rotation about said central axis,
   d. forming by turning a ring gear mounting surface concentric about said central axis having a diameter which is greater than said predetermined diameter,
   e. heating said ring gear sufficiently to cause the diameter of said inside shrink-fit surface to become larger than the diameter of said ring gear mounting surface and mounting said ring gear on said ring gear mounting surface,
   f. cooling said ring gear to shrink fit said ring gear onto said ring gear mounting surface,
   g. forming by turning at least one additional surface on said cast metal hub, and
   h. balancing said cast metal hub and ring gear assembly.

2. A process as defined in claim 1, further including the steps of unclamping and reclamping said cast metal hub subsequent to said step of heating and mounting said ring gear to relieve stress in said cast metal hub and ring gear assembly.

3. A process as defined in claim 1 further including the step of spraying coolant on said ring gear after said step of heating and mounting said ring gear.

4. A process as defined in claim 1, wherein said step of machining a first surface includes the substep of machining a clutch face on said cast metal hub.

5. A process as defined in claim 4, wherein said step of machining a first surface includes the further substeps of machining a slinger bore area and a pilot bore.

6. A process as defined in claim 5, wherein said substep of forming a pilot bore involves only rough machining, said bore to leave approximately 0.025 inch of stock for subsequent finish machining.

7. A process as defined in claim 6, wherein said step of heating said ring gear is preceded by the step of machining a crank face and crank bore concentrically arranged relative to said ring gear mounting surface.

8. A process as defined in claim 7, wherein said step of machining said additional surface includes the step of finish machining said crank bore, crank face and pilot bore.

* * * * *